E. R. STODDARD.
METAL WORKING TOOL.
APPLICATION FILED NOV. 16, 1914.
1,149,417.
Patented Aug. 10, 1915.
2 SHEETS—SHEET 1.
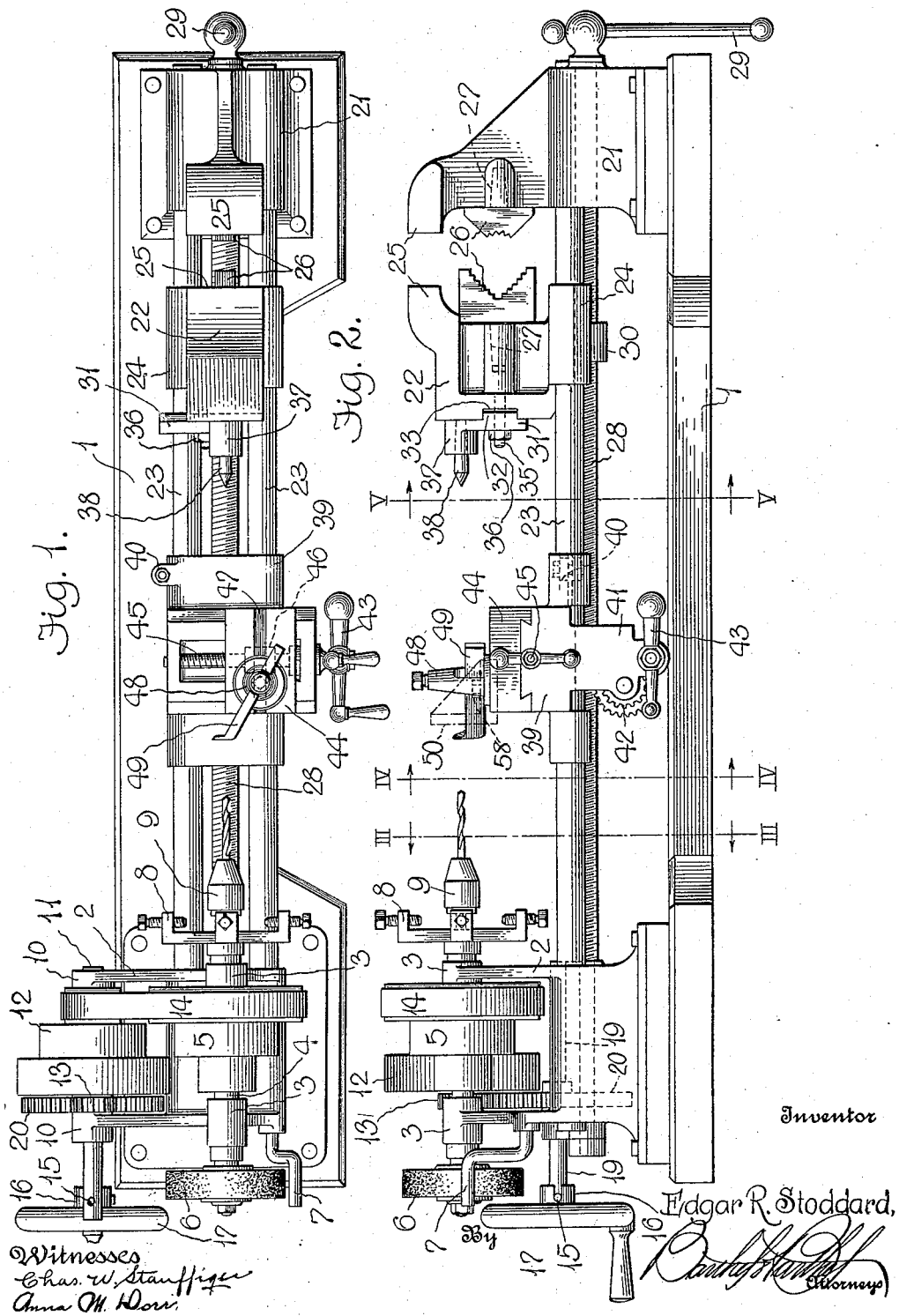
Witnesses
Chas. W. Stauffiger
Anna M. Dorr
Inventor
Edgar R. Stoddard,
By
Attorneys E. R. STODDARD.
METAL WORKING TOOL.
APPLICATION FILED NOV. 16, 1914.
1,149,417.
Patented Aug. 10, 1915.
2 SHEETS—SHEET 2.
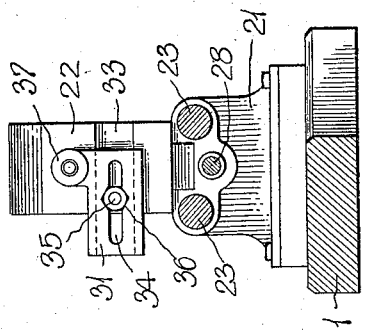
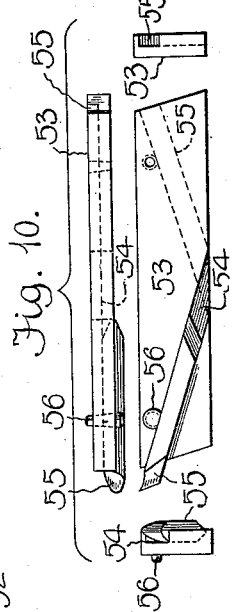
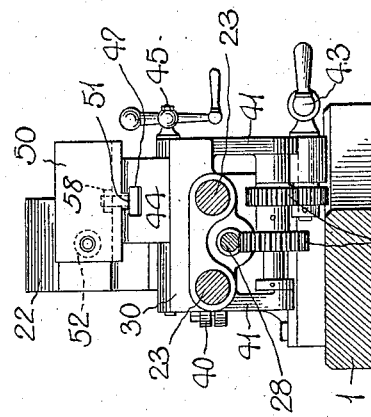
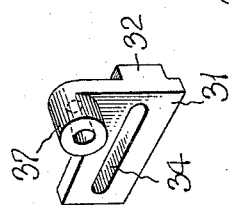
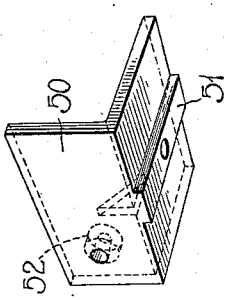
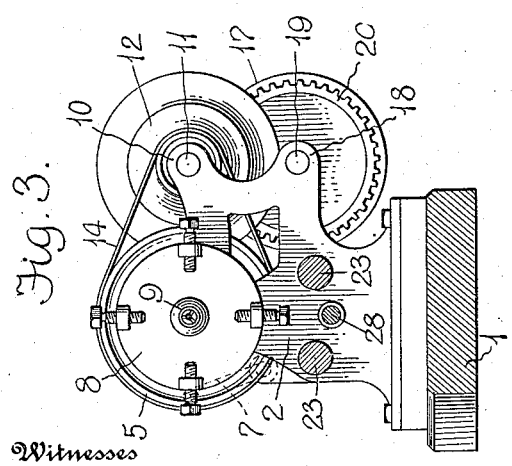
Witnesses
Chas. W. Stauffiger.
Anna M. Dorr.
Inventor
Edgar R. Stoddard,
By
Attorneys

UNITED STATES PATENT OFFICE.

EDGAR R. STODDARD, OF DETROIT, MICHIGAN.

METAL-WORKING TOOL.

1,149,417. Specification of Letters Patent. Patented Aug. 10, 1915.

Application filed November 16, 1914. Serial No. 872,281.

*To all whom it may concern:*

Be it known that I, EDGAR R. STODDARD, a citizen of the United States of America, residing at Detroit, in the county of Wayne and State of Michigan, have invented certain new and useful Improvements in Metal-Working Tools, of which the following is a specification, reference being had therein to the accompanying drawings.

This invention relates to a metal working tool that has been primarily designed as a hand power tool or machine, but provision is made whereby the tool or machine can be operated by a motor or from a suitable source of power.

The object of my invention is to combine a lathe and vise and thereby form a tool or machine that can be advantageously used for all the purposes of either in connection with small metal workings.

As a lathe, the head stock thereof has a change speed mechanism and provision is made whereby an emery wheel, a drill chuck, dog and chuck plates, tool holders, centers and other well known lathe appurtenances can be used.

The tail stock is in the form of a vise and the movable jaw of the vise serves functionally as the tail stock proper. The tail stock has various attachments and the feed screw for the movable jaw of the vise serves functionally as a rack in connection with the carriage of the lathe. The carriage has a special equipment and the various attachments permit of most any kind of metal working being performed in connection with the tool or machine.

The above and other objects are attained by a combination of structural elements that will be hereinafter specifically described and then claimed, and reference will now be had to the drawing wherein—

Figure 1 is a plan of the tool or machine; Fig. 2 is a side elevation of the same; Fig. 3 is a cross sectional view taken on the line III—III of Fig. 2, illustrating the head stock; Fig. 4 is a similar view taken on the line IV—IV of Fig. 2, illustrating the carriage; Fig. 5 is a similar view taken on the line V—V of Fig. 2 illustrating the tail stock; Fig. 6 is a perspective view of a carriage attachment; Fig. 7 is a similar view of a tail stock attachment, Figs. 8 and 9 are perspective views of parts of a vise attachment, and Fig. 10 illustrates views of a cutter holder that can be used in connection with the lathe.

In the drawings, the reference numeral 1 denotes a bed plate and mounted upon one end thereof is a head stock 2. The head stock 2 has bearings 3 for a main shaft 4 provided with a stepped pulley or cone 5. The ends of the shaft 4 protrude from the ends of the head stock 2 and an emery wheel 6 can be mounted upon the outer end of the shaft. The head stock has a rest 7 continguous to the wheel 6 and any abrading or polishing device can be substituted for the emery wheel 6. The inner end of the main shaft 4 accommodates a chuck 8, a tool holder 9 or any of the well known lathe attachments for a head stock.

10 denotes bearings for a drive shaft 11 which is provided with a stepped pulley or cone 12 and a small gear wheel 13. A belt 14 is trained over the pulleys 5 and 12 and by shifting the belt various speeds can be transmitted to the main shaft. The outer end of the drive shaft 11 has a transverse pin 15 and this end of the shaft is adapted to receive the slotted hub 16 of a hand wheel or pulley 17. The slotted hub 16 permits of the hand wheel or pulley being interlocked with the drive shaft for rotative continuity therewith.

18 denotes bearings for a countershaft 19 which is provided with a large gear wheel 20 meshing with the small gear wheel 13 of the drive shaft 11. The outer end of the countershaft 19 is constructed similar to the outer end of the drive shaft 11, whereby the hand wheel or pulley 17 can be transferred to the countershaft and a high speed imparted to the main shaft 4.

21 denotes the stationary member of a tail stock and associated therewith is a movable member 22 which constitutes the tail stock proper. The stationary member 21 is mounted upon the end of the bed plate 1 and is connected to the head stock 2 by parallel longitudinal shears 23 upon which slide the bearing sleeves 24 of the movable member 22. The members 21 and 22 constitute a vise and have jaws 25 for gripping flat surfaces of a piece of work and detachable jaws 26 for gripping a pipe or the curvilinear surfaces of a piece of work. The detachable jaw 26 has a shank or tang 27 that can be easily mounted in the confronting faces of the members 21 and 22, as best shown in Fig. 2 of the drawing.

28 denotes a longitudinally disposed feed screw that is journaled in the head stock 2 and the stationary member 21 of the tail stock, said feed screw having the outer end thereof provided with a shiftable crank or hand wheel 29. The feed screw 28 is in screwthreaded engagement with a depending nut 30 carried by the movable member or tail stock proper. By rotating the feed screw 28 the movable member 22 can be adjusted to and from the stationary member 21.

31 denotes an attachment for the movable member 22 or tail stock proper. The attachment is in the form of a plate provided with a longitudinal tongue 32 adapted to slide in a transverse groove 33 provided therefor in the end of the movable member. The plate and tongue have a longitudinal slot 34 and extending through said slot is a stud bolt 35 forming part of the movable member 32. A nut 36 is screwed upon the stud bolt to hold the plate 31 in an adjusted position. One end of the plate 31 has a boss or socket member 37 for a center or dead spindle 38, and it is through the medium of the adjustable attachment that tapering work can be performed in connection with the machine.

39 denotes a carriage slidably mounted upon the shears 23 and capable of being fixed relative thereto through the medium of a clamp 40 at one end of the carriage. The carriage has depending bearings 41 supporting a train of gears 42 that are placed in motion by a hand wheel 43 at the front side of the carriage. One of the gears 42 meshes with the feed screw 28, which serves functionally as a rack, whereby the carriage can be adjusted longitudinally of the shears 23.

44 denotes a slide bearing having a tongue and groove connection with the top of the carriage 39 and said slide bearing is shifted upon the carriage through the medium of a feed screw 45 and a nut 46, both being of the ordinary and well known construction of the carriage of an ordinary lathe. The top of the slide bearing 44 has a groove 47 and adjustable in said groove is a tool post 48 for a tool 49. The tool post 48 is of a conventional form adapted to adjustably and detachably hold the tool.

50 denotes an attachment for the slide bearing 44, this attachment being in the form of an angle plate provided with a depending tongue 51 adapted to engage in the groove 47, said angle plate being adjustably held by a bolt 58, as shown in dotted lines in Figs. 2 and 4. The angle plate 50 constitutes a support or backing for a piece of work that can be held against the angle plate and operated upon by a drill or tool of the head stock. The angle plate 50 has an apertured boss 52 in which can be placed a drill or other tool to operate upon a piece of work revolved by the head stock 2 of the machine.

53 denotes a cutter having the sides thereof provided with angularly disposed grooves 54 and 55 adapted to accommodate a cutter 55 held in position by a tapering pin 56. This cutter holder can be used in connection with the carriage 39 to operate upon a piece of work held by either the head stock or the tail stock.

From the foregoing it will be observed that the use of the carriage 39 depends upon the feed screw 28, which serves as a rack, and that the feed screw shifts the movable member 22 of the vise to a desired position whereby a piece of work can be held in the vise or between the head and tail stocks of the lathe.

It is thought that the operation and utility of the machine will be apparent to an artisan, and while in the drawing there is illustrated a preferred embodiment of my invention, it is to be understood that the structural elements are susceptible to such variations and modifications as fall within the scope of the appended claims.

What I claim is:—

1. A machine of the type described, comprising a head stock, a stationary vise member, shears connecting said head stock and said stationary vise member, a movable vise member on said shears providing a tail stock, a feed screw journaled in said head stock and stationary member and adapted to shift said movable vise member upon said shears, a carriage on said shears, and means in connection with said carriage for engaging said feed screw to move said carriage longitudinally of said shears.

2. A machine of the type described, comprising a head stock, a stationary vise member, shears connecting said head stock and said stationary vise member, a movable vise member on said shears providing a tail stock, a carriage movable on said shears, and a feed screw common to said carriage and said movable vise member whereby either can be shifted.

3. A machine of the type described, comprising a head stock, a stationary vise member, shears connecting said head stock and said stationary vise member, a movable vise member on said shears, a center attachment carried by said movable vise member, a carriage on said shears, an angle plate adjustable on said carriage, and means supported by said head stock and said stationary vise member to facilitate moving said carriage and said movable vise member independent of each other.

In testimony whereof I affix my signature in presence of two witnesses.

EDGAR R. STODDARD.

Witnesses:
ANNA M. DORR,
KARL H. BUTLER.